(12) United States Patent
Boykin et al.

(10) Patent No.: US 7,908,346 B2
(45) Date of Patent: Mar. 15, 2011

(54) PROCESSING A PLURALITY OF REQUESTS SIMULTANEOUSLY IN A WEB APPLICATION

(75) Inventors: James R. Boykin, Pflugerville, TX (US); Christopher A. Peters, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 12/426,692

(22) Filed: Apr. 20, 2009

(65) Prior Publication Data
US 2010/0268758 A1 Oct. 21, 2010

(51) Int. Cl.
*G06F 15/16* (2006.01)
(52) U.S. Cl. ......... 709/219; 707/E17.117; 707/E17.121; 707/E17.122; 709/202
(58) Field of Classification Search .................. 709/202, 709/219; 707/E17.117, E17.121, E17.122
See application file for complete search history.

(56) References Cited

U.S. PATENT DOCUMENTS

| | | | |
|---|---|---|---|
| 5,287,453 A | 2/1994 | Roberts | |
| 7,596,620 B1 * | 9/2009 | Colton et al. ................. | 709/226 |
| 2008/0028081 A1 | 1/2008 | Bruss | |
| 2008/0228867 A1 | 9/2008 | Murphy et al. | |

OTHER PUBLICATIONS

"Ajax (programming)", http://en.wikipedia.org/wiki/AJAX, printed on Feb. 16, 2009, 4 pages.
"Comet (programming)", http://en.wikipedia.org/wiki/Comet_ (programming), printed on Feb. 16, 2009, 7 pages.
"Raising network.http.max-persistent-connections-per-server?", http://groups.google.com/group/mozilla.dev.apps.firefox/browse_thread/thread/5eebb8c65c34c3c6/323b25cfd9211f, printed on Feb. 16, 2009, 2 pages.
"The Two HTTP Connection Limit Issue", http://www.openajax.org/runtime/wiki/The_Two_HTTP_Connection_Limit_Limit_Issue, printed on Feb. 16, 2009, 6 pages.

* cited by examiner

*Primary Examiner* — George C Neurauter, Jr.
(74) *Attorney, Agent, or Firm* — Francis Lammes; Stephen J. Walder, Jr.; Jeffrey S. LaBaw (57) ABSTRACT

A mechanism is provided for sending a plurality of requests to a server. A set of calls is received in a client from a set of client applications. Each call is for a request to be sent to the server and each call comprises a plurality of parameters. For each call, the client determines whether there is a request identifier in the plurality of parameters. Responsive to the call including the request identifier, the client creates a request using the plurality of parameters. The client sends the request to the server via a request connection. The client then determines whether an acknowledgement that indicates that the server has received the request has been received from the server. Responsive to receiving the acknowledgement, the client processes a next call in the set of calls.

20 Claims, 5 Drawing Sheets

PROCESSING A PLURALITY OF REQUESTS SIMULTANEOUSLY IN A WEB APPLICATION

BACKGROUND

The present application relates generally to an improved data processing apparatus and method and more specifically to an apparatus and method for processing a plurality of requests simultaneously in a Web application.

Changing trends in the use of World Wide Web technology and Web design that aim to enhance creativity, communications, secure information sharing, collaboration, and functionality of the Web has had an enormous impact on the Internet. Web applications are much more responsive thanks to Web development techniques, such as Asynchronous JavaScript and XML (Ajax), reverse Ajax, or the like. Web pages that use Ajax are more responsive and interactive because they exchange small amounts of data with the server "behind the scenes" so that the entire Web page does not have to be reloaded each time there is a need to fetch data from the server. Reverse Ajax (or Comet) leaves open a connection to the server so that the server can send data to the client as soon as it is available.

The more a Web page utilizes techniques such as Ajax and Comet, the more responsive and rich it will be. For instance, a Web page that uses one Ajax request to fetch data for an entire table will not be as up to date or as interactive as a Web page that uses many Comet style connections to fetch data for each row or each cell in the table as soon as new data is available. The problem with using these techniques is that the Hypertext Transfer Protocol (HTTP) 1.1 specification states that "A single-user client should not maintain more than 2 connections with any server or proxy" and this recommendation is followed by most browsers, including Internet Explorer, and the like.

The two connection limit issue means that holding one connection open for Comet can therefore impact performance. The browser may be unable to send a new user-initiated Ajax request while the browser loads, for example, a series of images. Another problem arises if a Web page uses Ajax to retrieve many pieces of information from the server at the same time. Imagine a systems management application that uses Ajax to fetch the status of twenty different machines in a table. The Web page would only be able to retrieve two status values at any given time because of the two connection limit issue.

Ajax and Comet are two very useful techniques that allow for the creation of very rich internet applications. However, the two HTTP connection limit issue means that these techniques have to be used carefully and sparingly at times. Many JavaScript™ libraries exist that utilize Ajax, two major libraries being Prototype and Dojo. Neither toolkit allows more than one outstanding Ajax request from the client at a time. The following paragraph from the Alternatives section of the Comet Wikipedia® page talks more about alternatives that are available:

"Instead of using browser-native technologies to provide persistent connections, some developers instead turn to plugins, such as Java applets or the proprietary Adobe Flash. These have the advantage of working identically across all browsers with the appropriate plugin installed, need not use HTTP connections, and face none of the security restrictions placed on browser-native transports. These strengths, however, are also the main drawbacks of proprietary plugins: not all clients have the plugins installed—for instance, the Apple iPhone includes neither—and the use of protocols other than HTTP, and ports other than port 80, can cause them to be blocked by firewalls."

SUMMARY

In one illustrative embodiment, a method, in a data processing system, is provided for sending a plurality of requests to a server. The illustrative embodiment receives a set of calls from a set of client applications. In the illustrative embodiment each call is for a request to be sent to the server and each call comprises a plurality of parameters. For each call, the illustrative embodiment determines whether there is a request identifier in the plurality of parameters. The illustrative embodiment creates a request using the plurality of parameters in response to the call including the request identifier. The illustrative embodiment sends the request from the client to the server via a request connection. The illustrative embodiment determines whether an acknowledgement has been received from the server. In the illustrative embodiment the acknowledgement indicates that the server has received the request. The illustrative embodiment then processes a next call in the set of calls in responsive to receiving the acknowledgement.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism that allows Web developers to send a plurality of requests to a server. No matter how many requests are made to the server at anytime, there will be, at most, two connections open to the server. The illustrative embodiments allow applications to be very rich while at the same time staying under the two connection limit issue while still using browser-native technologies.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
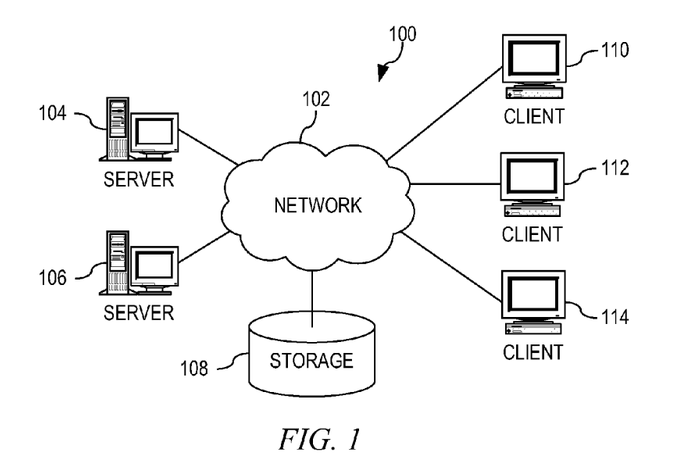
FIG. 1 depicts a pictorial representation of an example distributed data processing system in which aspects of the illustrative embodiments may be implemented.
Figure 2:
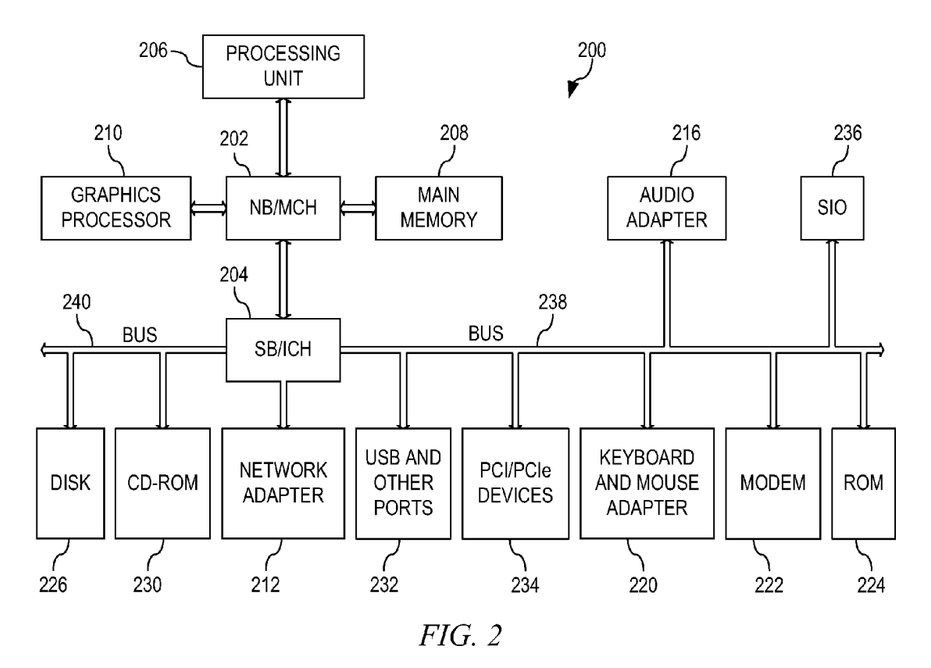
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that processing a plurality of requests simultaneously in a Web application, this is only an example and is not intended to state or imply any limitation with regard to the features of the present invention. To the contrary, the illustrative embodiments are intended to include distributed data processing environments and embodiments in which a plurality of requests may be simultaneously processed in a Web application.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super 110 (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
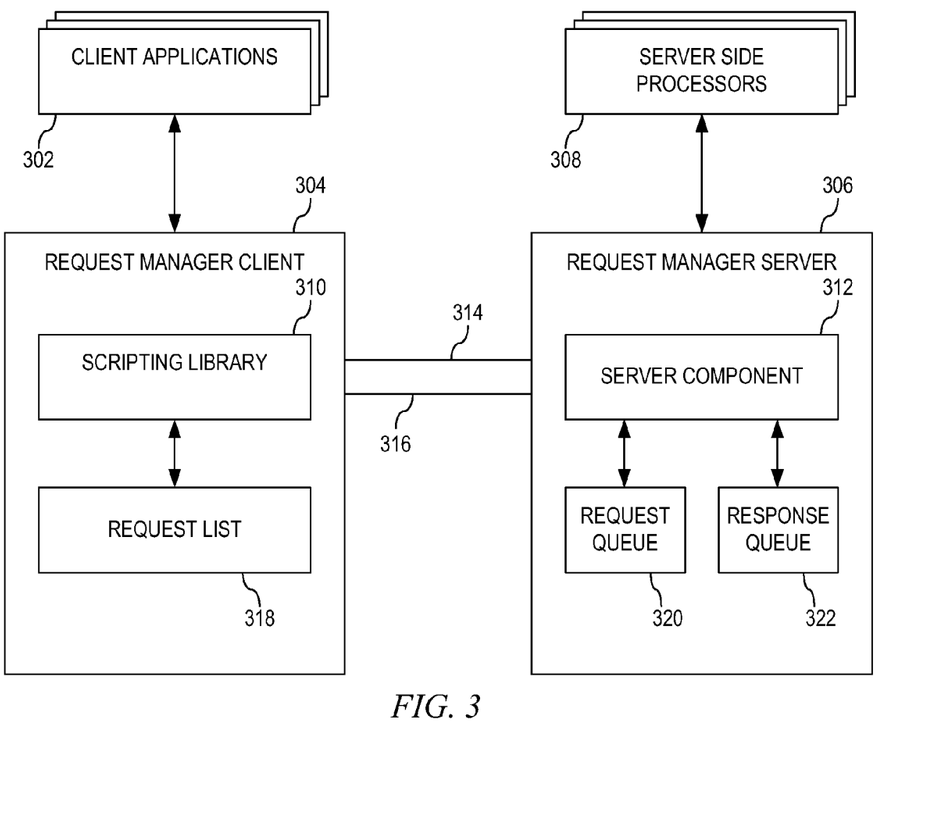
FIG. 3 depicts a functional block diagram of a mechanism that processes a plurality of requests simultaneously in a Web application in accordance with an illustrative embodiment.

FIG. 3 depicts a functional block diagram of a mechanism that processes a plurality of requests simultaneously in a Web application in accordance with an illustrative embodiment. The illustrative mechanism comprises client applications 302, request manager client 304, request manager server 306, and server side processors 308. Request manager client 304 may further comprise scripting language library 310, which may be a library that uses a scripting language such as Java-Script™, cascading style sheets (CSS), HyperText Markup Language (HTML), or the like. Client applications 302 make calls to scripting language library 310, so that, scripting language library 310 may create requests to be sent to server component 312 in request manager server 306. Scripting language library 310 provides a function that may be called by client applications 302 to send requests to server side processors 308. The function accepts parameters, such as those provided by exiting Ajax libraries, XMLHTTPRequest (XHR) objects, or the like. XMLHTTPRequest (XHR) is a Document Object Model (DOM) application programming interface (API) that may be used by scripting languages to transfer Extensible Markup Language (XML) and other text data between a web server and a browser.

Parameters that may be received by the function within scripting language library 310 may include a processor (a Uniform Resource Locator (URL) or Java™ class name that will handle the request on the server), the response type to expect (XML, HTML, JavaScript Object Notation (JSON), or the like), a list of parameters to send on the request, a handler in client applications 302 that may be called when a response is returned from server component 312, or the like. Another parameter in the request from client applications 302 that may also be received by the function within scripting language library 310 is a request identifier (ID). If the request ID is not specified by client applications 302, scripting language library 310 may generate a unique ID for the request.

The remaining description of FIG. 3 uses HTTP standard communication mechanisms. In the illustrative embodiments, the HTTP standard communication mechanism to send requests from scripting language library 310 to server component 312 in request manager server 306 is Asynchronous JavaScript and Extensible Markup Language (XML) (Ajax). In the illustrative embodiments, the HTTP standard communication mechanism to receive responses in the scripting language library 310 from server component 312 in request manager server 306 is Comet (or reverse Ajax). However, the illustrative embodiments recognize that any type of Web development technique may be used to create interactive Web applications to send requests or to allow a Web server to send a response to a client without the client explicitly requesting the response without departing from the spirit and scope of the illustrative embodiments.

Scripting language library 310 maintains, at most, two connections to server component 312; request connection 314 and response connection 316. On startup, scripting language library 310 establishes response connection 316 in order to receive responses from server component 312. Response connection 316 is left open until a response is available on server component 312. When scripting language library 310 receives a request from client applications 302, scripting language library 310 establishes request connection 314 in order to send the request to server component 312, creates a request using the various parameters received from client applications 302, stores a copy of the request in request list 318 for use when a response is received from server component 312, and sends the request to the server component 312 via request connection 314. Thus, request connection 314 is only active when requests are sent. Request connection 314 uses Ajax to send the requests to server component 312.

Server component 312 receives the request from scripting language library 310 and builds a "task" using the request ID or unique ID, handling the request using any request parameters included with the request. Server component 312 queues the task in request queue 320 and then returns an acknowledgment of receiving the request to scripting language library 310 immediately so that scripting language library 310 may send more requests to server component 312. Scripting language library 310 uses the acknowledgment to begin processing other request to be sent to server component 312 and waits for the actual response to the requests to be returned on response connection 316. Thus, upon receiving the acknowledgement from server component 312, scripting language library 310 is now able to accept additional requests from other ones of client applications 302. Server component 312 then calls one of server side processors 308 to execute the task as specified in the received request. When the specified one of server side processors 308 completes execution of the task associated with the request, server component 312 queues the response from the task in response queue 322 in order to respond to scripting language library 310 on response connection 316 using Comet. Server component 312 sets the request ID or unique ID in the response header so that the response can be matched to its associated request on scripting language library 310. Server component 312 processes the response in response queue 322 and sends the response to scripting language library 310.

Scripting language library 310 receives the response from server component 312 and uses the request ID or unique ID from the response to find an associated request object in request list 318. Scripting language library 310 then calls a function, such as an European Computer Manufacturers Association (ECMA) script (ECMAScript), a JavaScript™, a Jscript®, or the like, in client applications 302 that is identified from the request object and passes the response to the handler in client applications 302. Scripting language library 310 then opens another response connection 316 to server component 312 to wait for another response. If there is a response waiting on server component 312 when response connection 316 is established by scripting language library 310, then server component 312 returns the response immediately so scripting language library 310 may process the response. If there are no responses waiting on server component 312, scripting language library 310 leaves response connection 316 open, so that, when an expected response is available on server component 312, the response may be sent to scripting language library 310.

Thus, the illustrative embodiment queues requests on the server via a request connection using Ajax. The server builds tasks to process the requests keeping track of the request IDs or unique IDs. When the server completes a task, the response is added to a response queue. When the response queue is processed the response is sent back to the client via a response connection using Comet. The request ID or unique ID is sent back with the response so that it can be used to match the response to its original request. Once the request associated with the request ID or unique ID is found, an associated handler is identified and the response is forwarded to the handler for processing.

Figure 4:
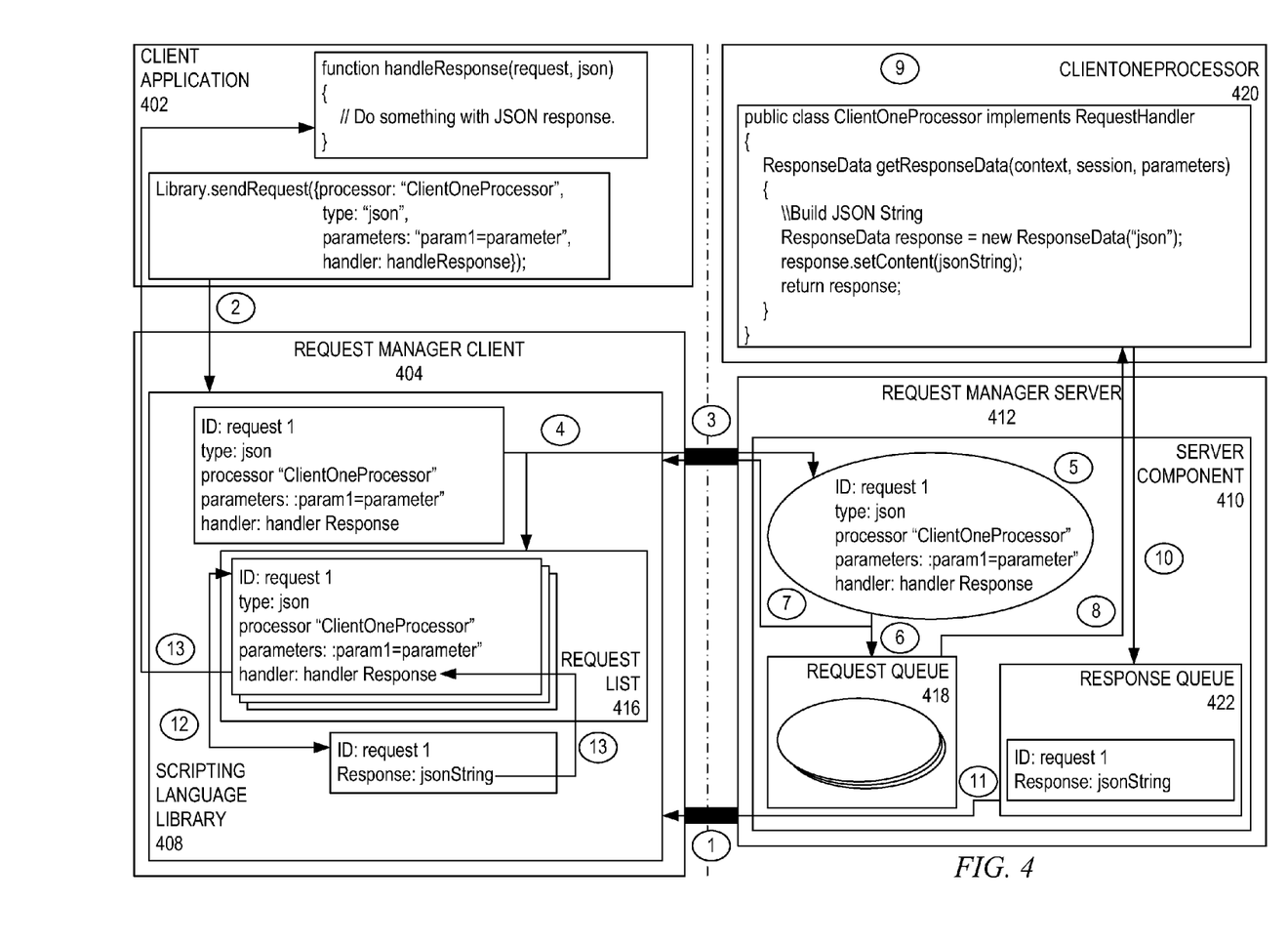
FIG. 4 depicts an example of a request being processed by the illustrative mechanism in accordance with an illustrative embodiment.

FIG. 4 depicts an example of a request being processed by the illustrative mechanism in accordance with an illustrative embodiment. In this example, scripting language library 408 establishes a response connection to server component 410 in order to receive responses from server component 410 (step 1). The response connection is left open until a response is available on server component 410. Client application 402 sends a call to scripting language library 408 (step 2) in request manager client 404. Scripting language library 408 then establishes a request connection in order to send a request to server component 410 in request manager server 412 (step 3). Scripting language library 408 then creates a request using the various parameters received from client application 402, stores a copy of the request in request list 416 for use when a response is received from server component 410, and sends the request to server component 410 via the request connection (step 4).

Server component 410 receives the request from scripting language library 408 and builds a "task" using the request ID or unique ID, handling the request using any request parameters included with the request (step 5). Server component 410 then queues the task in request queue 418 and builds an acknowledgment of receiving the request to be sent to scripting language library 408 (step 6). Server component 410 sends the acknowledgement back to scripting language library 408 on the request connection so that scripting language library 408 may send more requests to server component 410 (step 7).

Server component 410 then executes the queued task asynchronously and the task calls the server side processor specified in the parameters of the request, in this example, ClientOneProcessor 420 (step 8). ClientOneProcessor 420 creates a response to the task (step 9), queues the response in response queue 422, and sends a notification to server component 410 that the response queue should be processed (step 10). Server component 410 takes the response from response queue 422 and sets the request ID or unique ID in the response header so that the response can be matched to its associated request in scripting language library 408 and sends the response to scripting language library 408 on the response connection (step 11). Scripting language library 408 receives the response from server component 410 and uses the request ID or unique ID from the response to find an associated request object in the stored list in scripting language library 408 (step 12). Upon obtaining the request from the stored list, scripting language library 408 formats the response and passes the response to the handler in client application 402 specified in the request (step 13). Scripting language library 408 then re-establishes a response connection to server component 410 in order to receive other responses from server component 410 (step 1). If server component 410 has a response waiting in its response queue, server component 410 returns the response back to scripting language library 408 immediately so scripting language library 408 may process the response and re-establish the response connection. If server component 410 does not have a response when the response connection is made, server component 410 maintains the connection to the client until a response is ready to be sent to scripting language library 408.

In addition to the above described steps, there are other steps that may occur during the process. For example, once scripting language library 408 receives the acknowledgement from server component 410 in step 7, scripting language library 408 may automatically establish another request connection to server component 410 if another call has been received from another client application. Additionally, once the server component 410 queues a response from a task in step 10, the server component 410 may queue another response from another request that has completed execution. Additionally, once scripting language library 408 receives a response to a request from server component 410 in step 12, scripting language library 408 may establish another response connection to server component 410 to receive other responses from the server.

Thus the illustrative embodiments provide for:
  one connection to be used to make requests and one connection to be used to receive responses;
  each request sent to the request manager server has a request ID received from the client application or a unique ID generated by the scripting language library;
  a list of request objects are maintained in the scripting language library of the request manager client, accessible by request ID or unique ID;
  the request manager server processes requests asynchronously in that the request manager server returns an acknowledgement before the actual response is processed;
  the request manager server "calls" a specified server processor asynchronously, as in a thread pool, based on the parameters received in the request;
  when the request manager server completes the execution of the request, the request manager server passes the response to the scripting language library, setting the request ID or the unique ID in the response header;

the scripting language library accesses the request ID from response header and looks up request object; and the scripting language library identifies the handler specified in the request object and passes the response to the identified handler.

Figure 5A:
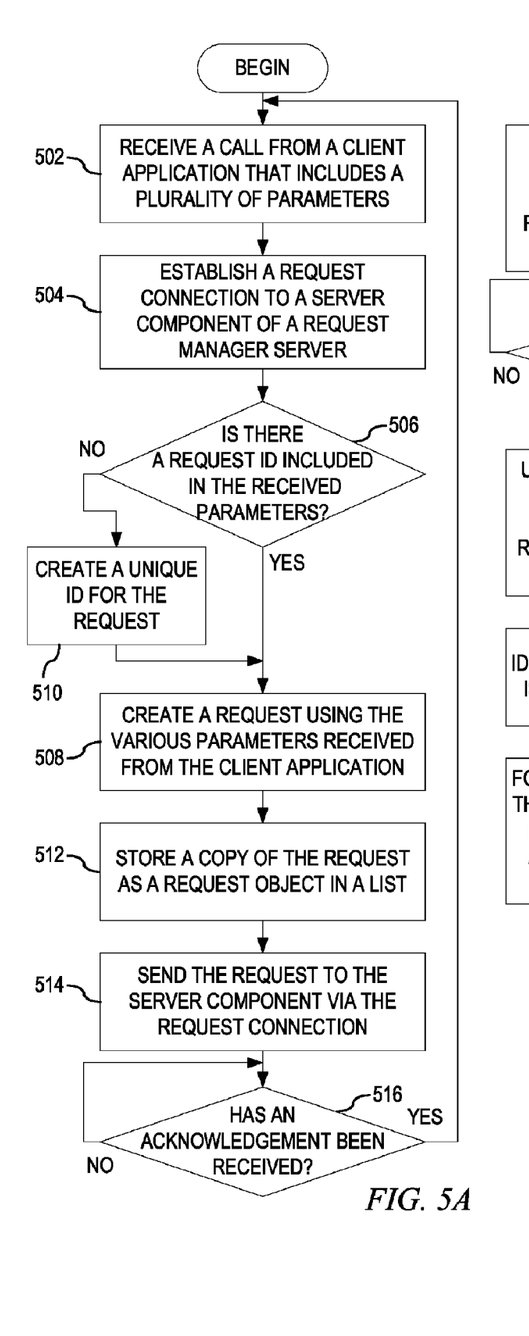
FIGS. 5A and 5B depict a flow diagram of the operation performed by a scripting language library within a request manager client in accordance with an illustrative embodiment.

FIG. 5A depicts a flow diagram of the operation performed in handling an incoming call by a scripting language library within a request manager client in accordance with an illustrative embodiment. As the operation begins, the scripting language library receives a call from a client application that includes a plurality of parameters (step 502). The scripting language library establishes a request connection to a server component of a request manager server in order to send a request to the server component (step 504). The scripting language library determines if there is a Request ID included in the received parameters (step 506). If at step 506, the scripting language library determines that there is a Request ID included in the parameters, then the scripting language library creates a request using the various parameters received from the client application (step 508). If at step 506 the scripting language library determines that there is not a Request ID included in the parameters, the scripting language library creates a unique ID for the request (step 510), with the operation proceeding to step 508 thereafter.

From step 508, the scripting language library stores a copy of the request as a request object in a list for use when a response is received from the server component (step 512) and then sends the request to the server component via the request connection (step 514). At this point, the scripting language library determines if an acknowledgement has been received from the server component (step 516). If at step 516 an acknowledgement has not been received, then the operation returns to step 516 to wait for an acknowledgement. If at step 516 the scripting language library receives an acknowledgement from the server component, the operation returns to step 502 so that the scripting language library is ready to receive additional calls from the client applications.

Figure 5B:
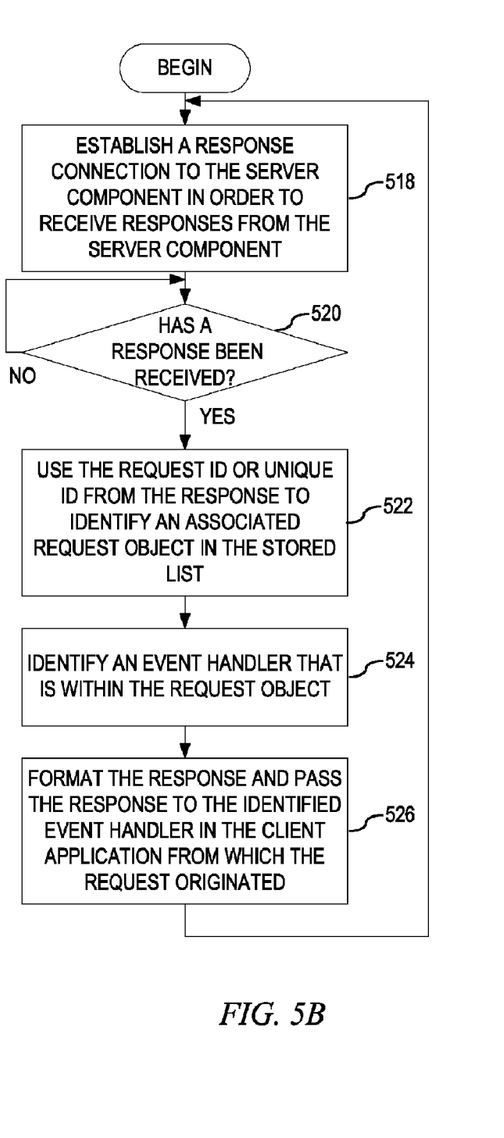

FIG. 5B depicts a flow diagram of the operation performed in handling incoming responses by a scripting language library within a request manager client in accordance with an illustrative embodiment. As the operation begins, the scripting language library establishes a response connection to the server component in order to receive responses from the server component (step 518). The response connection is left open until a response is received from the server component. The scripting language library then determines if a response has been received from the server component (step 520). If at step 520 a response has not been received, then the operation returns to step 520 to wait for a response. If at step 520 the scripting language library receives a response, the scripting language library uses the request ID or unique ID from the response to identify an associated request object in the stored list (step 522). Upon obtaining the request object from the stored list, the scripting language library identifies a handler that is within the request object (step 524). The scripting language library then formats the response and passes the response to the identified handler in the client application from which the request originated (step 526), with the operation returning to step 518 thereafter.

Figure 6A:
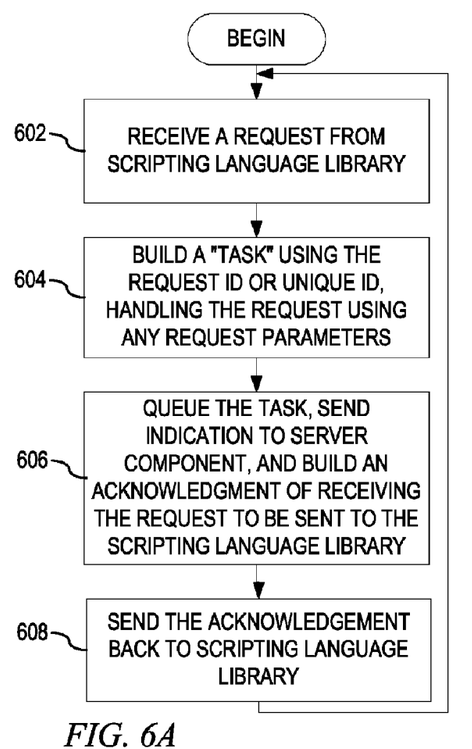
FIG. 6A depicts a flow diagram of the operation for receiving requests performed by a server component within a request manager server in accordance with an illustrative embodiment.

FIG. 6A depicts a flow diagram of the operation for receiving requests performed by a server component within a request manager server in accordance with an illustrative embodiment. As the operation begins, the server component receives a request from scripting language library (step 602). The server component builds a "task" using the request ID or unique ID, handling the request using any request parameters included with the request (step 604). The server component then queues the task in a request queue, sends an indication to the server side processor that a task is in the request queue, and builds an acknowledgment of receiving the request to be sent to the scripting language library (step 606). The server component sends the acknowledgement back to scripting language library so that scripting language library may send more requests to the server component (step 608), with the operation returning to step 602 thereafter.

Figure 6B:
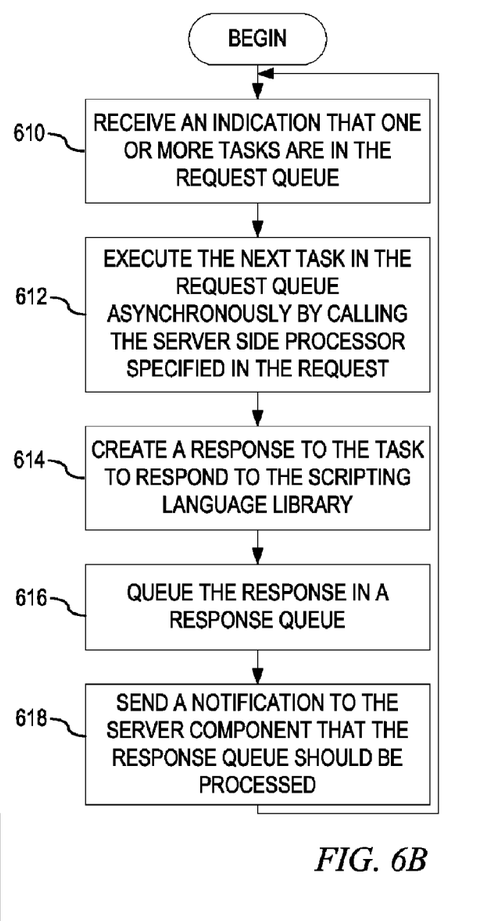
FIG. 6B depicts a flow diagram of the operation for executing tasks and building response requests performed by a server side processor within a request manager server in accordance with an illustrative embodiment.

FIG. 6B depicts a flow diagram of the operation for executing tasks and building response requests performed by a server side processor within a request manager server in accordance with an illustrative embodiment. As the operation begins, the server component receives an indication that one or more tasks are in the request queue (step 610). The server component then executes the next task in the request queue asynchronously by calling the server side processor specified in the request (step 612). When the server component completes execution of the task associated with the request, then the server component creates a response to the task to respond to the scripting language library (step 614). The server component queues the response in a response queue (step 616) and sends a notification that the response queue should be processed (step 618), with the operation returning to step 610 thereafter.

Figure 6C:
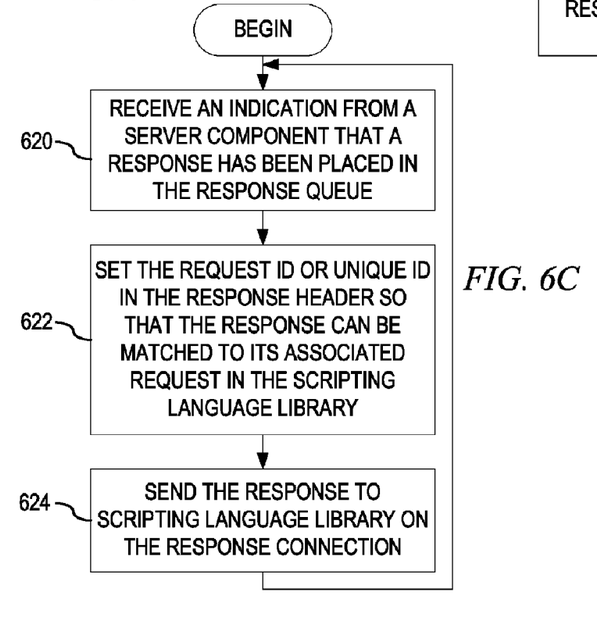
FIG. 6C depicts a flow diagram of the operation for processing responses performed by a server component within a request manager server in accordance with an illustrative embodiment.

FIG. 6C depicts a flow diagram of the operation for processing responses performed by a server component within a request manager server in accordance with an illustrative embodiment. As the operation begins, the server component receives an indication that a response has been placed in the response queue (step 620). The server component then processes the response queue by taking the response from the queue and setting the request ID or unique ID in the response header so that the response can be matched to its associated request in the scripting language library (step 622). The server component then sends the response to scripting language library on the response connection (step 624), with the operation returning to step 620 thereafter.

Thus, the illustrative embodiments provide mechanisms for queuing requests on the server via a request connection. The server builds tasks to process the requests keeping track of the request IDs or unique IDs. When the server completes a task, the response is sent back to the client via a response connection. The request ID or unique ID is sent back with the response so that it can be used to match the response to its original request. Once the request associated with the request ID or unique ID is found, an associated handler is identified and the response is forwarded to the handler for processing.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for sending a plurality of requests to a server, the method comprising:
   receiving, in a client, a set of calls from a set of client applications, wherein each call is for a request to be sent to the server and wherein each call comprises a plurality of parameters;
   for each call, determining, in the client, whether there is a request identifier in the plurality of parameters;
   responsive to the call including the request identifier, creating, in the client, a request using the plurality of parameters;
   sending the request from the client to the server via a request connection;
   determining, in the client, whether an acknowledgement has been received from the server, wherein the acknowledgement indicates that the server has received the request; and
   responsive to receiving the acknowledgement, processing, in the client, a next call in the set of calls.

2. The method of claim 1, wherein the request is sent from the client to the server via a request connection using a HTTP standard communication mechanism and wherein the HTTP standard communication mechanism is Asynchronous JavaScript and Extensible Markup Language (XML) (Ajax).

3. The method of claim 1, further comprising:
   responsive to the call failing to include the request identifier, generating, by the client, a unique identifier; and
   creating, in the client, the request using the plurality of parameters and the unique identifier.

4. The method of claim 3, further comprising:
   storing, in the client, a copy of each request in a request list prior to sending each request to the server via the request connection, wherein each request includes its associated request identifier;
   determining, in the client, whether a response has been received from the server via a response connection;
   responsive to receiving the response from the server, identifying, in the client, an associated request in the request list using a request identifier associated with the response;
   responsive to matching the response to a request in the request list, identifying, in the client, a handler associated with a client application in the set of client applications that initiated the request;
   formatting, in the client, the response; and
   sending the response from the client to the handler in the client application.

5. The method of claim 4, wherein the response is received from the server via the response connection using a HTTP standard communication mechanism and wherein the HTTP standard communication mechanism is Comet.

6. The method of claim 1, further comprising:
   building, in the server, a task using the plurality of parameters in the request received from the client, wherein the plurality of parameters indicates a specific processor that is to execute the task;
   queuing the task in a request queue in the server;
   sending an indication that the task is in the request queue;
   building, in the server, an acknowledgement indicating that the task has been received; and
   sending the acknowledgement from the server to the client.

7. The method of claim 6, further comprising:
   receiving, in the server, the indication of the task being in the request queue;
   executing, by the server, the task in the request queue asynchronously;
   calling, by the server, a processor to create the response to the task;
   creating, by the processor, the response to the task; and
   sending, by the processor, an indication that the response is ready.

8. The method of claim 7, further comprising:
   receiving, in the server, the indication from the processor that the response is ready;
   queuing, by the server, the response in a response queue;
   processing, by the server, the response in the response queue; and
   sending, by the server, the response from the server to the client via the response connection.

9. The method of claim 8, wherein processing the response in the response queue comprises:
   setting the request identifier in a response header of the response in order for the response to be matched to a request in a request list in the client.

10. The method of claim 1, wherein the plurality of parameters comprise one or more of a processor, a response type to expect, a list of parameters to send on the request, or a handler in one of the set of client applications that may be called when the response is returned from the server.

11. A computer program product comprising a non-transitory computer recordable medium having a computer readable program recorded thereon, wherein the computer readable program, when executed on a computing device, causes the computing device to:
   receive, in a client, a set of calls from a set of client applications, wherein each call is for a request to be sent to a server and wherein each call comprises a plurality of parameters;
   for each call, determine, in the client, whether there is a request identifier in the plurality of parameters;
   responsive to the call including the request identifier, create, in the client, a request using the plurality of parameters;
   send the request from the client to the server via a request connection;
   determine, in the client, whether an acknowledgement has been received from the server, wherein the acknowledgement indicates that the server has received the request; and
   responsive to receiving the acknowledgement, process, in the client, a next call in the set of calls.

12. The computer program product of claim 11, wherein the computer readable program further causes the computing device to:
   responsive to the call failing to include the request identifier, generate, by the client, a unique identifier;
   create, in the client, the request using the plurality of parameters and the unique identifier;

store, in the client, a copy of each request in a request list prior to sending each request to the server via the request connection, wherein each request includes its associated request identifier;

determine, in the client, whether a response has been received from the server via a response connection;

responsive to receiving the response from the server, identify, in the client, an associated request in the request list using a request identifier associated with the response;

responsive to matching the response to a request in the request list, identify, in the client, a handler associated with a client application in the set of client applications that initiated the request;

format, in the client, the response; and send the response from the client to the handler in the client application.

13. The computer program product of claim 11, wherein the computer readable program further causes the computing device to:

build, in the server, a task using the plurality of parameters in the request received from the client, wherein the plurality of parameters indicates a specific processor that is to execute the task;

queue the task in a request queue in the server;

send an indication that the task is in the request queue;

build, in the server, an acknowledgement indicating that the task has been received;

send the acknowledgement from the server to the client;

receive, in the server, the indication of the task being in the request queue;

execute, by the server, the task in the request queue asynchronously;

call, by the server, a processor to create the response to the task;

create, by the processor, the response to the task;

send, by the processor, an indication that the response is ready;

receive, in the server, the indication from the processor that the response is ready;

queue, by the server, the response in a response queue;

process, by the server, the response in the response queue; and send, by the server, the response from the server to the client via the response connection.

14. The computer program product of claim 11, wherein the computer readable program is stored in the non-transitory computer recordable medium in a data processing system and wherein the computer readable program was downloaded over a network from a remote data processing system.

15. The computer program product of claim 11, wherein the computer readable program is stored in the non-transitory computer recordable medium in a server data processing system and wherein the computer readable program is downloaded over a network to a remote data processing system for use in a non-transitory computer recordable medium within the remote system.

16. An apparatus, comprising:

a processor; and a memory coupled to the processor, wherein the memory comprises instructions which, when executed by the processor, cause the processor to:

receive, in a client, a set of calls from a set of client applications, wherein each call is for a request to be sent to a server and wherein each call comprises a plurality of parameters;

for each call, determine, in the client, whether there is a request identifier in the plurality of parameters;

responsive to the call including the request identifier, create, in the client, a request using the plurality of parameters;

send the request from the client to the server via a request connection;

determine, in the client, whether an acknowledgement has been received from the server, wherein the acknowledgement indicates that the server has received the request; and responsive to receiving the acknowledgement, process, in the client, a next call in the set of calls.

17. The apparatus of claim 16, wherein the instructions further cause the processor to:

responsive to the call failing to include the request identifier, generate, by the client, a unique identifier; and create, in the client, the request using the plurality of parameters and the unique identifier.

18. The apparatus of claim 17, wherein the instructions further cause the processor to:

store, in the client, a copy of each request in a request list prior to sending each request to the server via the request connection, wherein each request includes its associated request identifier;

determine, in the client, whether a response has been received from the server via a response connection;

responsive to receiving the response from the server, identify, in the client, an associated request in the request list using a request identifier associated with the response;

responsive to matching the response to a request in the request list, identify, in the client, a handler associated with a client application in the set of client applications that initiated the request;

format, in the client, the response; and send the response from the client to the handler in the client application.

19. The apparatus of claim 16, wherein the instructions further cause the processor to:

build, in the server, a task using the plurality of parameters in the request received from the client, wherein the plurality of parameters indicates a specific processor that is to execute the task;

queue the task in a request queue in the server;

send an indication that the task is in the request queue;

build, in the server, an acknowledgement indicating that the task has been received; and send the acknowledgement from the server to the client.

20. The apparatus of claim 19, wherein the instructions further cause the processor to:

receive, in the server, the indication of the task being in the request queue;

execute, by the server, the task in the request queue asynchronously;

call, by the server, a processor to create the response to the task;

create, by the processor, the response to the task;

send, by the processor, an indication that the response is ready;

receive, in the server, the indication from the processor that the response is ready;

queue, by the server, the response in a response queue;

process, by the server, the response in the response queue; and send, by the server, the response from the server to the client via the response connection.

* * * * *